United States Patent
Chen et al.

(10) Patent No.: US 9,904,383 B2
(45) Date of Patent: Feb. 27, 2018

(54) TOUCH PANEL AND MANUFACTURING METHOD OF CONDUCTION LAYER OF TOUCH PANEL

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Chen-You Chen, Hsinchu (TW); Shang-Yu Huang, Hsinchu (TW); Chun-Chi Chen, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 149 days.

(21) Appl. No.: 14/886,321

(22) Filed: Oct. 19, 2015

(65) Prior Publication Data
US 2016/0283004 A1    Sep. 29, 2016

(30) Foreign Application Priority Data
Mar. 26, 2015  (CN) .......................... 2015 1 0135494

(51) Int. Cl.
| | |
|---|---|
| G06F 3/041 | (2006.01) |
| H05K 1/02 | (2006.01) |
| H05K 3/12 | (2006.01) |
| G06F 3/044 | (2006.01) |
| B32B 7/02 | (2006.01) |
| H05K 9/00 | (2006.01) |

(52) U.S. Cl.
CPC ..... *G06F 3/041* (2013.01); *G06F 2203/04103* (2013.01)

(58) Field of Classification Search
CPC ........................................................ G06F 3/044
See application file for complete search history.

(56) References Cited

U.S. PATENT DOCUMENTS

| | | | |
|---|---|---|---|
| 6,208,997 B1 * | 3/2001 | Sigeti ................ | G06F 17/30241 |
| 2010/0156840 A1 * | 6/2010 | Frey .................... | G06F 3/044 345/174 |
| 2012/0262412 A1 * | 10/2012 | Guard .................. | G06F 3/044 345/174 |

(Continued)

*Primary Examiner* — Lin Li
(74) *Attorney, Agent, or Firm* — ScienBiziP, P.C.

(57) ABSTRACT

A touch device includes a display panel with a plurality of pixel regions in a matrix, and a touch panel disposed on the display panel. The touch panel detects touch operations. The touch panel includes a substrate, a first conduction layer disposed on a surface of the substrate, and a second conduction layer disposed on a surface of the substrate. The first conduction layer includes a plurality of first conduction units arranged along a first direction. The second conduction layer includes a plurality of second conduction units arranged along a second direction perpendicular to the first direction. The first conduction units and the second conduction units are respectively formed by a plurality of randomized metal meshes connected with each other. The randomized metal mesh is formed based on a virtual randomized mesh shifted by a virtual regular mesh shift.

13 Claims, 7 Drawing Sheets

(56) References Cited

U.S. PATENT DOCUMENTS

| | | | |
|---|---|---|---|
| 2013/0222325 A1* | 8/2013 | Cok | G06F 3/044 345/174 |
| 2013/0294037 A1* | 11/2013 | Kuriki | H05K 9/00 361/748 |
| 2014/0078104 A1* | 3/2014 | Lee | G06F 3/044 345/174 |
| 2014/0218325 A1* | 8/2014 | Iwami | B32B 7/02 345/173 |
| 2014/0218642 A1* | 8/2014 | Iwami | G06F 3/044 349/12 |
| 2014/0225839 A1* | 8/2014 | Dunphy | G06F 3/0412 345/173 |
| 2016/0091998 A1* | 3/2016 | Chyan | G06F 3/044 345/174 |

\* cited by examiner

TOUCH PANEL AND MANUFACTURING METHOD OF CONDUCTION LAYER OF TOUCH PANEL

CROSS-REFERENCE TO RELATED APPLICATIONS

This application claims priority to Chinese Patent Application No. 201510135494.9 filed on Mar. 26, 2015, the contents of which are incorporated by reference herein.

FIELD

The subject matter herein generally relates to a touch panel.

BACKGROUND

Display devices with touch panels are widely used in everyday life. The touch panel includes a plurality of sensing electrodes. The sensing electrodes are metal mesh shaped.

BRIEF DESCRIPTION OF THE FIGURES

Implementations of the present technology will now be described, by way of example only, with reference to the attached figures.

DETAILED DESCRIPTION

Figure 1:
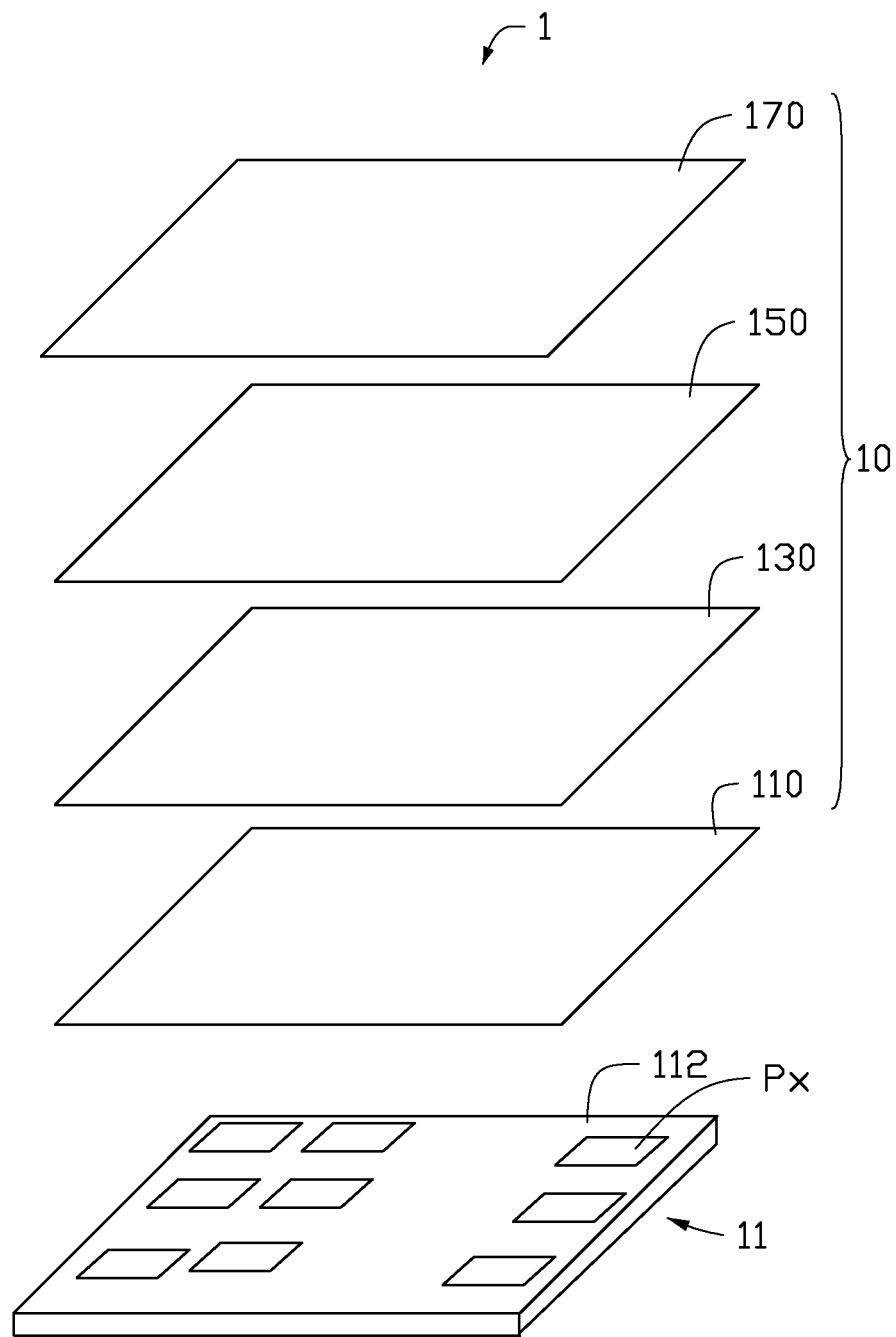
FIG. 1 is a diagrammatic view of an embodiment of a touch device; the touch device comprises a first conduction layer, and a second conduction layer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates a touch device 1. The touch device 1 includes a touch panel 10 and a display panel 11. The touch panel 10 is adhered on the display panel 11 by an adhesive material (not shown). The touch panel 10 is configured to sense a touch operation on the touch device 1 and locate a position of the touch operation. The touch panel 10 includes a first conduction layer 110, a substrate 130, a second conduction layer 150, and a protection layer 170. The display panel 11 includes a display region 112 with a plurality of pixel regions Px in a matrix. The first conduction layer 110 is adjacent to the display panel 11. The first conduction layer 110 cooperates with the second conduction layer 150 to form a capacitance (not shown). The substrate 130 is sandwiched between the first conduction layer 110 and the second conduction layer 150. The protection layer 170 is covering a surface of the second conduction layer 150 away from the substrate 130. In one embodiment, the display panel 11 is an organic light emitting diode (OLED) type display panel. The substrate 130 is made of transparent insulating material, such as glass, or polyethylene terephthalate (PET), and so on. The pixel regions Px includes a plurality of green pixel regions, a plurality of red pixel regions, and a plurality of blue pixel regions. In other embodiments, the first conduction layer 110 and the second conduction layer 150 are overlapping on a surface of the substrate 130, and an insulating layer is provided between the first conduction layer 110 and the second conduction layer 150.

Figure 2:
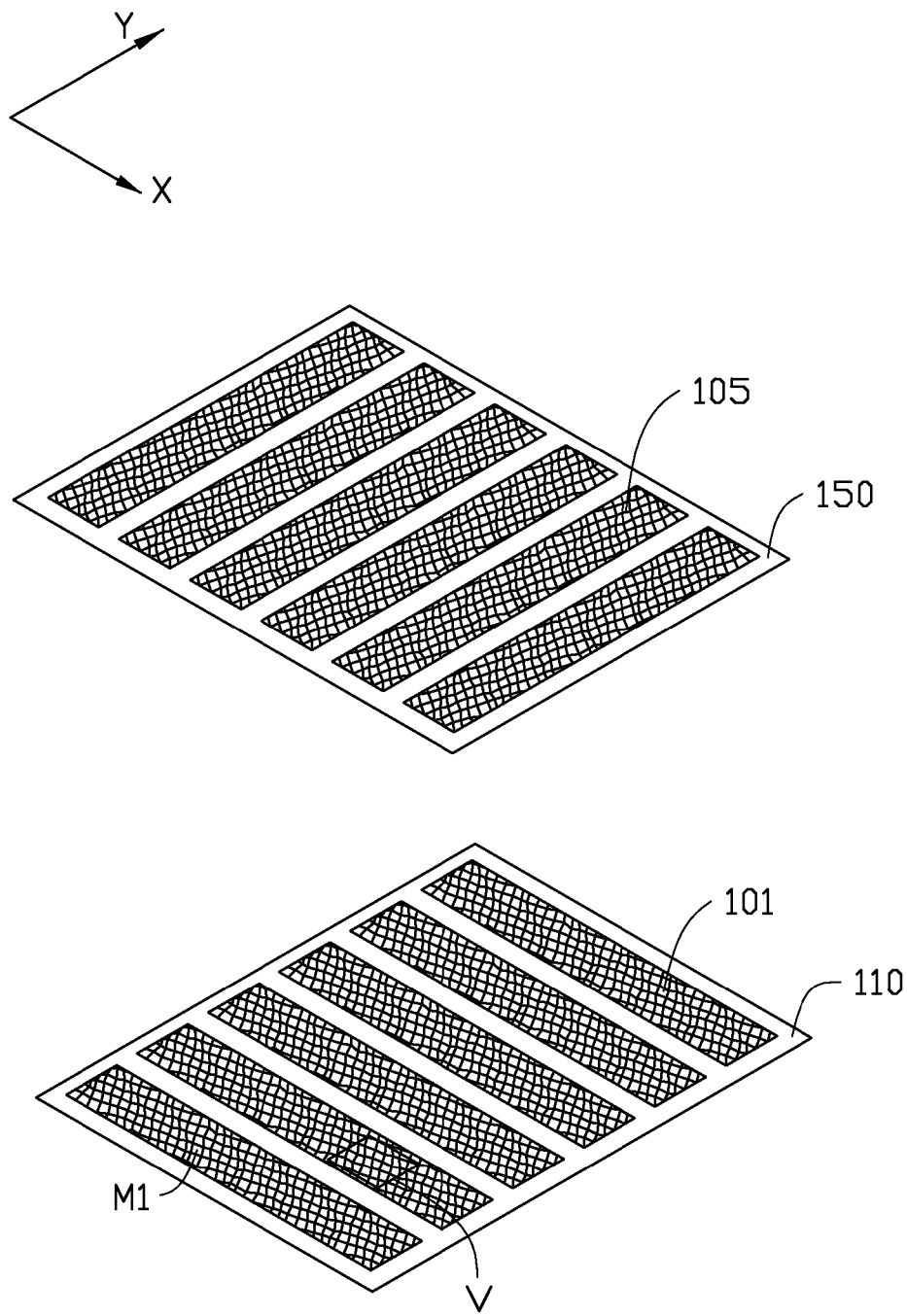
FIG. 2 is a partially enlarged, isometric view of an embodiment of the first conduction layer and the second conduction layer of FIG. 1, each of the first conduction layer and the second conduction comprise a plurality of randomized metal meshes.

FIG. 2 illustrates an embodiment of the first conduction layer 110 and the second conduction layer 150. The first conduction layer 110 includes a plurality of first conduction units 101 arranged along a first direction X. The second conduction layer 150 includes a plurality of second conduction units 105 arranged along a second direction Y perpendicular to the first direction X. The first conduction units 101 are spaced and insulated from each other, and the second conduction units 105 are spaced and insulated from each other. Each of the first conduction units 101 and the second conduction units 105 includes a plurality of randomized metal meshes M1 connected with each other.

Figure 3:
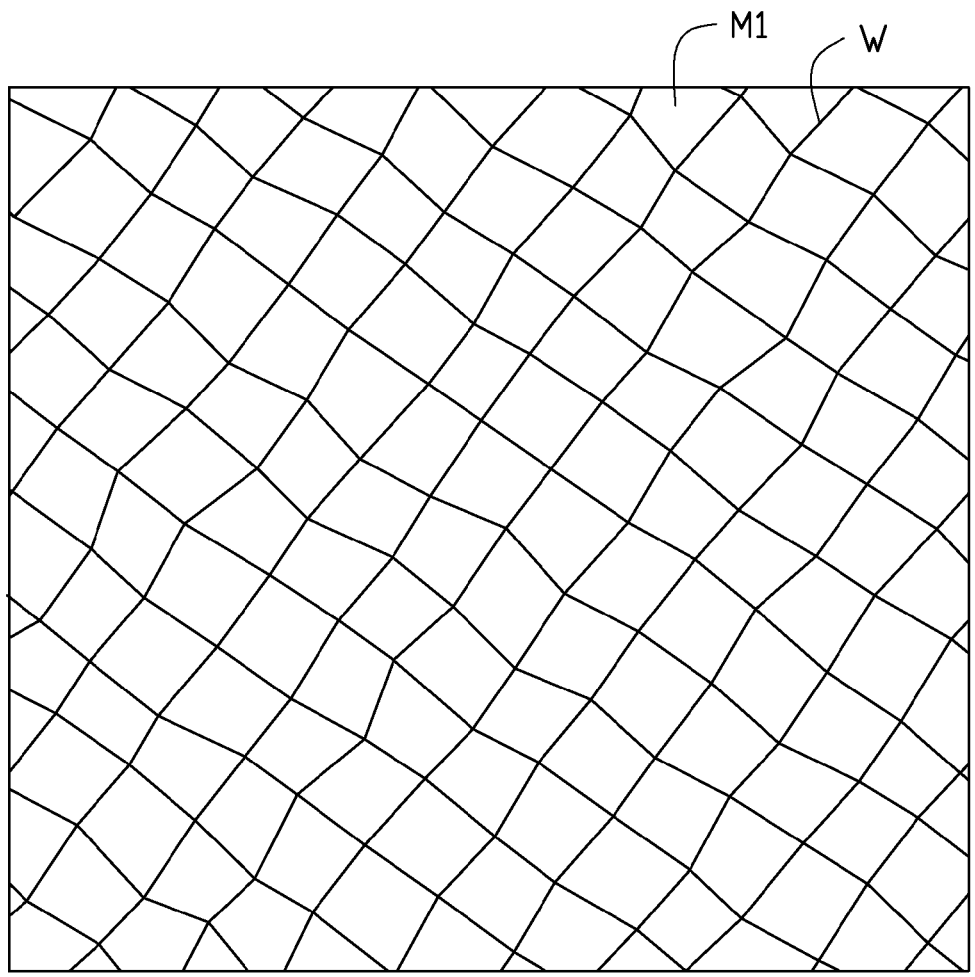
FIG. 3 is a partially enlarged plan view of section III of an embodiment of the metal meshes of FIG. 2.

FIG. 3 illustrates an embodiment of the randomized metal meshes M1. The randomized metal mesh M1 includes a plurality of metal lines W. The metal lines W are intersecting to form the randomized metal mesh M1. The metal lines W are substantially wave shaped. A width of the metal line W is in a range from 0.5 μm to 5 μm, and a length of the metal line W is in a range from 200 μm to 500 μm. In at least one embodiment, the metal line W is made of silver, nano silver, or a mixture material with silver, and so on.

A deviation between the first conduction layer 110 and the second conduction layer 150 while adhering on the substrate 130 can be reduced by the meshes W on the first conduction layer 110 and the second conduction layer 150. An area of a projection of the metal mesh M1 on the display panel 11 is reduced based on the shape of the metal mesh M1. Thus, a display quality of the touch device 1 is improved, and a morie effect of the touch device 1 is reduced.

Figure 4:
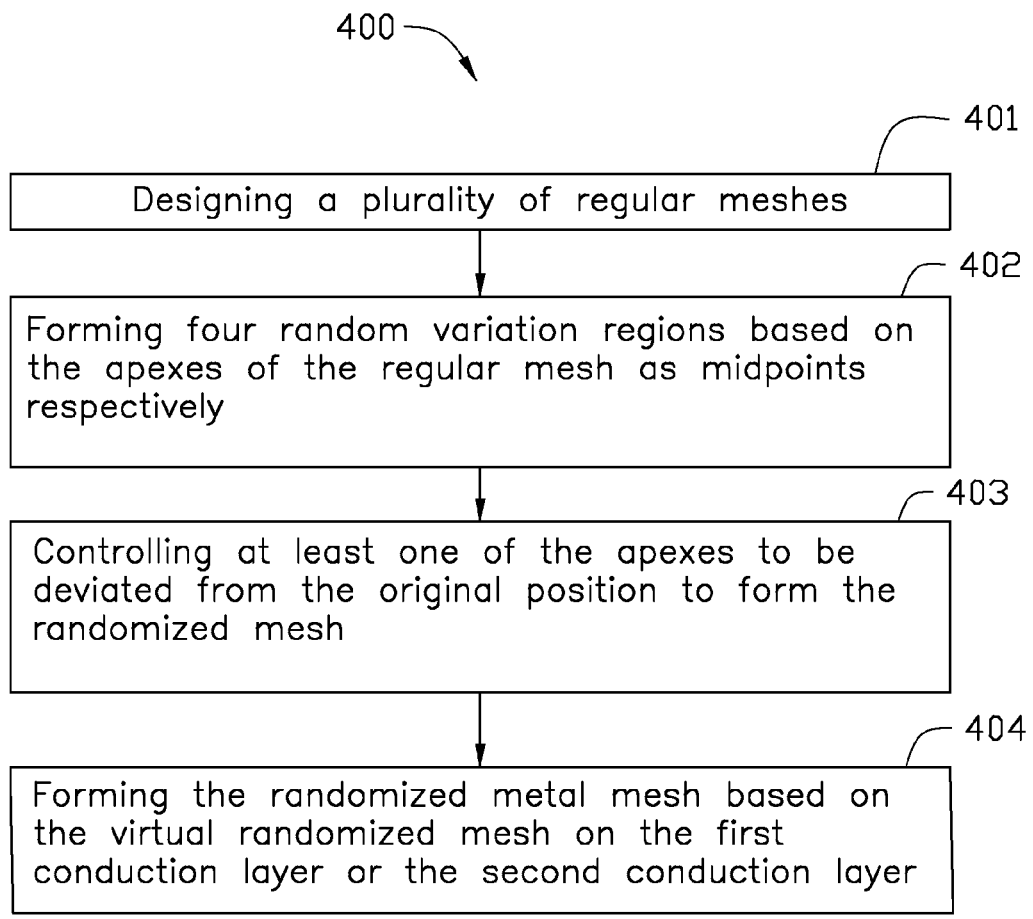
FIG. 4 is a flowchart of an embodiment of a method for manufacturing a conduction layer.

FIG. 4 illustrates a flowchart of an embodiment of a method for manufacturing the metal mesh M1 on the first conduction layer 110 or the second conduction layer 150.

The method 400 is provided by way of example, as there are a variety of ways to carry out the volume adjusting method. The method 400 described below can be carried out using the configurations illustrated in FIGS. 4-5, for example, and various elements of these figures are referenced in explaining the method 400. Each block shown in FIG. 4 represents one or more processes, methods or subroutines, carried out in the method 400. Furthermore, the order of blocks is illustrative only and the order of the blocks can change according to the present disclosure. Additional blocks can be added or blocks can be removed, without departing from this disclosure. The method 400 can begin at block 401.

Figure 5:
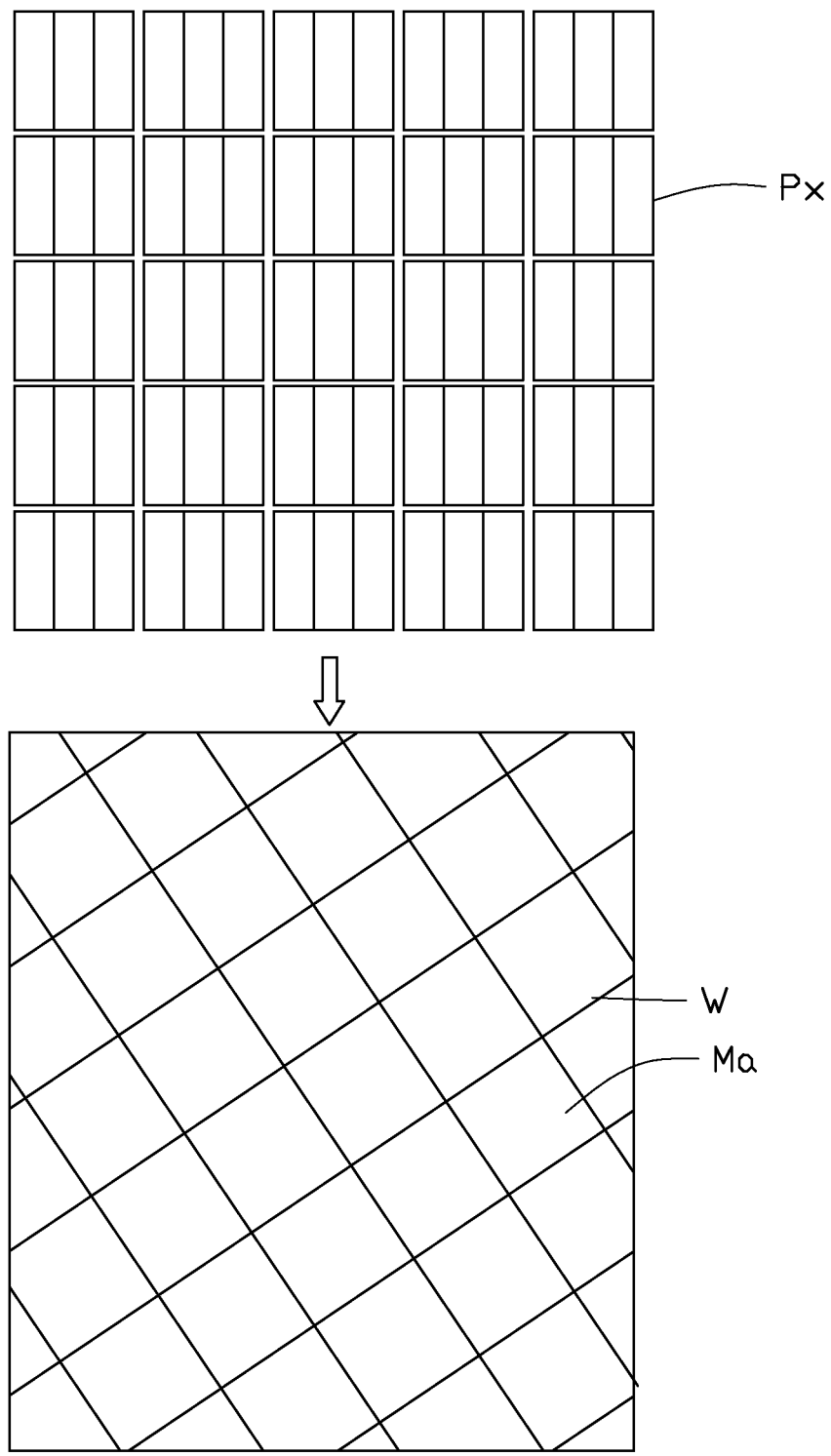
FIG. 5 is a diagrammatic view of an embodiment of metal meshes based on pixel regions.
Figure 6:
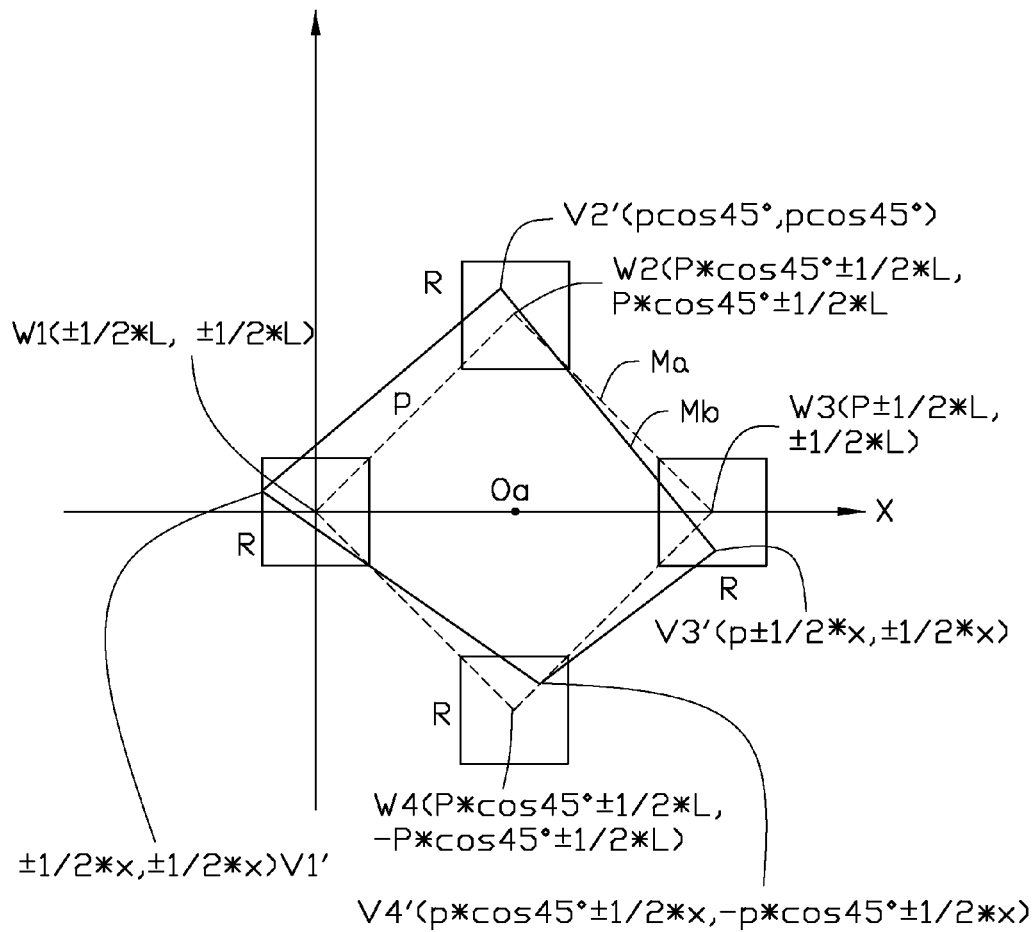
FIG. 6 is a diagrammatic view of an embodiment of regular meshes being deformed randomly of FIG. 5.

At block 401, a plurality of regular meshes Ma (as shown in FIG. 5) is designed. In at least one embodiment, the regular meshes Ma are virtual patterns designed by software, such as Flourier analysis/transform software. In detail, the regular meshes Ma are designed based on the size of the pixel region Px on the display region 112 of the display panel 11. The regular mesh Ma is a square shaped. As shown in FIG. 6, a XY coordinate system with an X axis and a Y axis is established. Oa is a midpoint Oa of the regular mesh Ma, P is a side of the regular mesh Ma, V1-V4 are apexes of the regular mesh Ma. The apexes V1, V3, and the midpoint Oa are located on the X axis. The apex V1 coincides with an origin of the XY coordinate system. The coordinates of the apex V1 are (0, 0), the coordinates of the apex V2 are (P*cos 45°, P*cos 45°), the coordinates of the apex V3 are (P, 0), and the coordinates of the apex V4 are (P*cos 45°, −P*cos 45°). An area of the regular mesh Ma is $P^2$. In at least one embodiment, the side P is in a range from 200 μm to 1000 μm. In particular, the side P is in a range from 600 μm to 1000 μm. The side P is larger than a length of the pixel region Px.

At block 402, four random variation regions R are formed based on the apexes V1-V4 as midpoints respectively. The random variation region R is regular region in a square shaped. L is a side of the random variation region R, and T1-T4 are apexes of the random variation region R. A random shifting ratio Q between the side of the regular mesh Ma and the side of the random variation region R is P/L. The random shifting ration Q is in a range from 30% to 50%. A length of the side L of the random variation region R is in a range from 60 μm to 500 μm, and an area of the random variation region R is in a range from 3,600 μm$^2$ to 250,000 μm$^2$. In at least one embodiment, the random shifting ration Q is 30%, the side L of the random variation region R is in a range from 100 μm to 500 μm, and the random variation region R is in a range from 10,000 μm$^2$ to 250,000 μm$^2$.

At block 403, at least one of the apexes V1-V4 is controlled to be deviated from the original position to a randomized position in the corresponding random variation regions R to form a randomized mesh Mb. In at least one embodiment, all of the apexes V1-V4 are shifted to form shifted apexes W1-W4. The coordinates of the shifted apex W1 are (±1/2*L, ±1/2*L). The coordinates of the shifted apex W2 are (P*cos 45°±1/2*L, P*cos 45°±1/2*L). The coordinates of the shifted apex W3 are (P±1/2*L, ±1/2*L). The coordinates of the shifted apex W4 are (P*cos 45°±1/2*L, −P*cos 45°±1/2*L).

Figure 7:
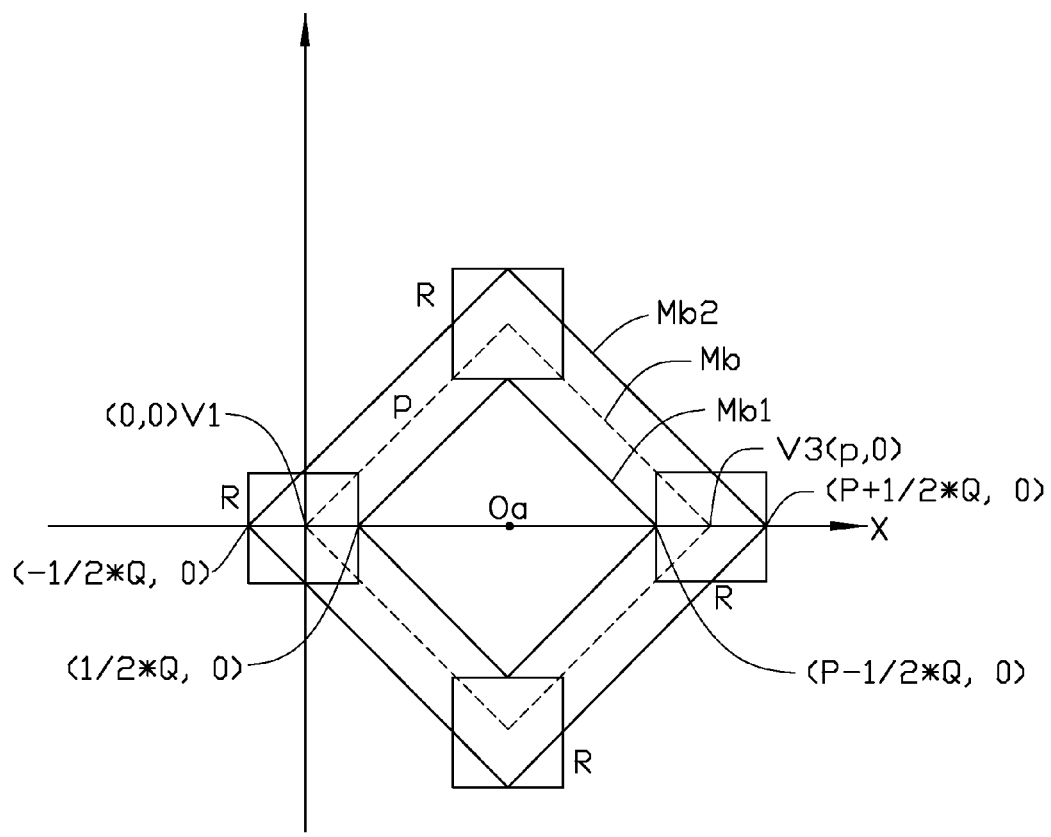
FIG. 7 is a diagrammatic view of an embodiment of the regular mesh being shifted to form virtual randomized meshes of FIG. 6.

FIG. 7 illustrates a first randomized mesh Mb1 and a second randomized Mb2. An area of the first randomized mesh Mb1 is a maximum area in the randomized meshes Mb, and is $(P/\cos 45° − 2*P*Q)^2/2 = P^2*(1/\cos 45° − 2*Q)^2/2$. An area of the second randomized mesh Mb2 is a minimum area in the randomized meshes Mb, and is $(P/\cos 45° + 2*P*Q)^2/2 = P^2*(1/\cos 45° + 2*Q)^2/2$. When the random shifting ratio Q is 30%, the area of the mesh Ma1 is 13,600 μm$^2$, the area of the mesh Mb2 is 2,000,000 μm$^2$. A ratio between the area of the mesh Mb1 and the area of the mesh Ma is 33%, and a ratio between the area of the mesh Mb2 and the area of the mesh Ma is 200%. When the random shifting ratio Q is 50%, the area of the mesh Mb1 is 4,000 μm$^2$, the area of the mesh Mb2 is 2,900,000 μm$^2$. A ratio between the area of the mesh Mb1 and the area of the mesh Ma is 8%, and a ratio between the area of the mesh Mb2 and the area of the mesh Ma is 260%. In at least one embodiment, the area of the randomized metal mesh M1 is in a range from 20,000 μm to 2,900,000 μm$^2$.

At block 404, the randomized metal mesh M1 is formed based on the virtual randomized mesh Mb on the first conduction layer 110 or the second conduction layer 150. In other embodiments, virtual randomized mesh Mb and the randomized metal mesh M1 can be but not limited to circle, triangle, rectangular, rhombus, pentagon, or hexagon shaped.

A deviation between the first conduction layer 110 and the second conduction layer 150 while adhering on the substrate 130 can be reduce by the meshes W on the first conduction layer 110 and the second conduction layer 150. An area of a projection of the randomized metal mesh M1 on the display panel 11 is reduced based on the shape of the randomized metal mesh M1. Thus, a display quality of the touch device 1 is improved, and the morie effect of the touch device 1 is reduced.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A touch device comprising:
    a display panel with a plurality of pixel regions in a matrix; and
    a touch panel disposed on the display panel and configured to detect touch operations thereon, the touch panel comprising:
        a substrate;
        a first conduction layer disposed on a first surface of the substrate and comprising a plurality of first conduction units arranged along a first direction; and
        a second conduction layer disposed on a second surface of the substrate and comprising a plurality of second conduction units arranged along a second direction perpendicular to the first direction;
    wherein the first conduction units comprises a plurality of randomized metal meshes connected with each other; the randomized metal mesh is formed based on a virtual randomized mesh shifted by a virtual regular mesh shifted through a software;
    wherein the second conduction units comprises a plurality of randomized metal meshes connected with each other; the randomized metal mesh is formed based on a virtual randomized mesh shifted by a virtual regular mesh shifted through the software;
    wherein the software designs a plurality of virtual regular meshes, forms four random variation regions used each apex of each of the virtual regular meshes as a midpoint, shifts at least one of the apexes of the regular meshes from an original position to a randomized position in the corresponding random variation region to form a virtual randomized mesh;

wherein a random shifting ratio between a side of the regular mesh and a side of the random variation region is in a range from 30% to 50%;

wherein when the random shifting ratio is in the range from 30% to 50%, an area of the randomized metal mesh is in a range from 13,600 µm² to 2,900,000 µm².

2. The touch device of claim 1, wherein an area of the random variation region is in a range between 10,000 µm² to 250,000 µm².

3. The touch device of claim 1, wherein a side of the random variation region is in a range between 100 µm to 500 µm.

4. The touch device of claim 1, wherein when the random shifting ratio is 50%, an area of the randomized metal mesh is in a range from 20,000 µm² to 2,900,000 µm².

5. The touch device of claim 1, wherein the substrate is sandwiched between the first conduction layer and the second conduction layer.

6. A method for manufacturing a metal mesh on a conduction layer of a touch panel in a touch device, the method comprising:
designing a plurality of regular meshes by a software;
forming four random variation regions used each apex of each of the regular mesh as a midpoint respectively;
controlling at least one of the apexes to be deviated from an original position to a randomized position in the corresponding random variation region to form at least one random mesh; and
forming the randomized metal mesh based on the at least one random mesh on the conduction layer;

wherein a random shifting ratio between a side of the regular mesh and a side of the random variation region is in a range from 30% to 50%;

wherein when the random shifting ratio is in the range from 30% to 50%, a ratio between an area of the randomized metal mesh and an area of the virtual randomized mesh is in a range from 33% to 200%.

7. The method of claim 6, wherein when the random shifting ratio is 50%, a ratio between an area of the randomized metal mash and an area of the virtual randomized mesh is in a range from 8% to 260%.

8. The method of claim 6, wherein the random variation region is a regular region in a square shaped.

9. The method of claim 6, wherein the randomized metal mesh comprises a plurality of metal lines; the metal lines are intersected to form the randomized metal mesh; a width of the metal line is in a range from 0.5 µm to 5 µm, and a length of the metal line is in a range from 200 µm to 500 µm.

10. The method of claim 6, wherein an area of the random variation region is in a range between 10,000 µm² to 250,000 µm².

11. The method of claim 6, wherein a side of the random variation region is in a range between 100 µm to 500 µm.

12. The method of claim 6, wherein an area of the randomized metal mesh is in a range from 13,600 µm² to 2,900,000 µm².

13. The method of claim 7, wherein an area of the randomized metal mesh is in a range from 20,000 µm² to 2,900,000 µm².

* * * * *